Dec. 18, 1951     H. S. RUEKBERG     2,579,399
MACHINE FOR MAKING CONTAINERS FROM PLASTIC TUBING
Filed March 5, 1951     5 Sheets-Sheet 1

HERBERT S. RUEKBURG
INVENTOR.

BY
ATTORNEY

Dec. 18, 1951     H. S. RUEKBERG     2,579,399
MACHINE FOR MAKING CONTAINERS FROM PLASTIC TUBING
Filed March 5, 1951     5 Sheets-Sheet 2

HERBERT S. RUEKBURG
INVENTOR.

BY
ATTORNEY

Dec. 18, 1951     H. S. RUEKBERG     2,579,399
MACHINE FOR MAKING CONTAINERS FROM PLASTIC TUBING
Filed March 5, 1951                  5 Sheets-Sheet 3
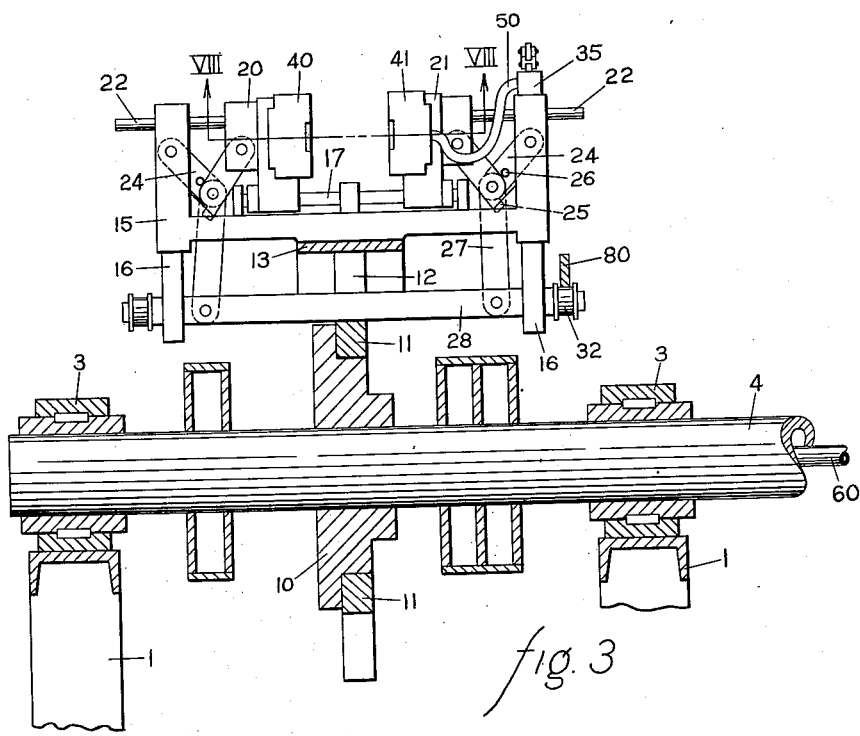
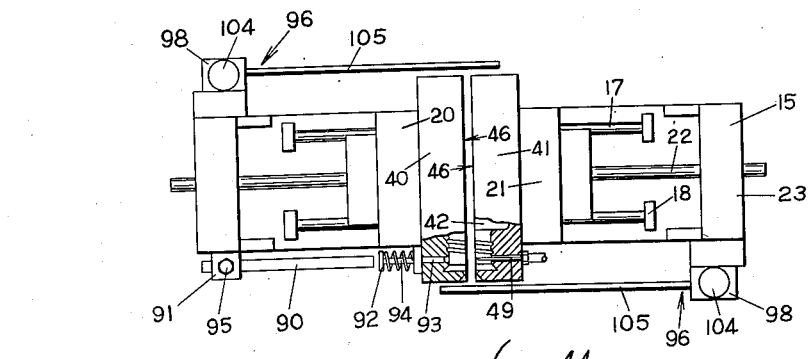
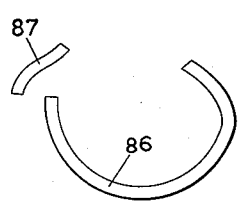
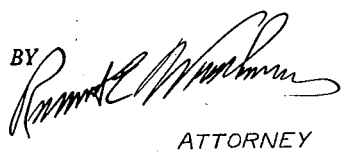
HERBERT S. RUEKBURG
INVENTOR.
BY
ATTORNEY

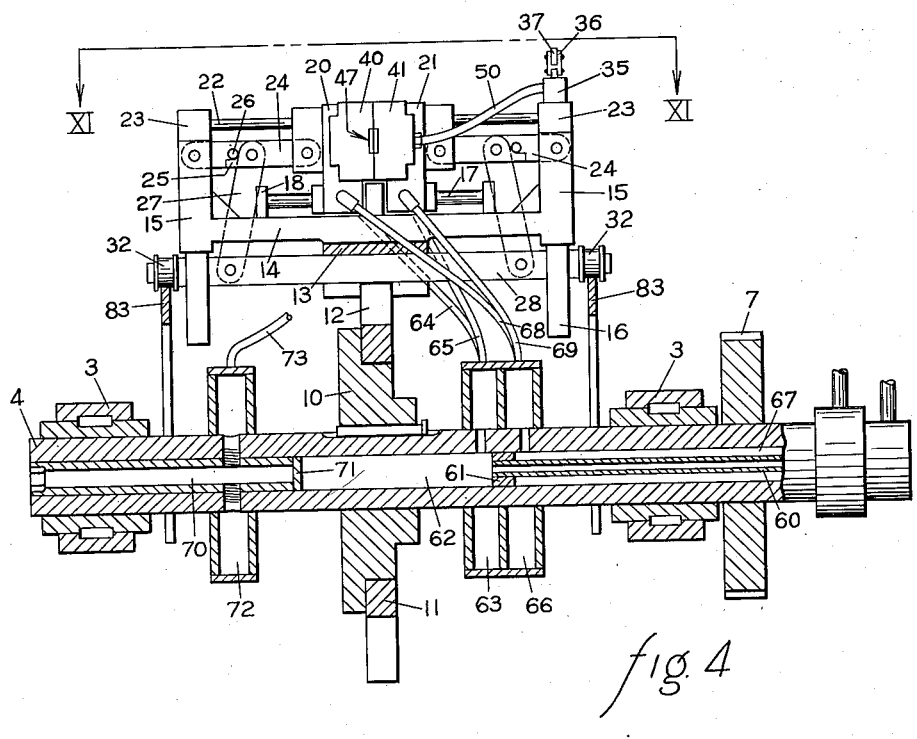

Dec. 18, 1951     H. S. RUEKBERG     2,579,399
MACHINE FOR MAKING CONTAINERS FROM PLASTIC TUBING
Filed March 5, 1951                       5 Sheets—Sheet 5
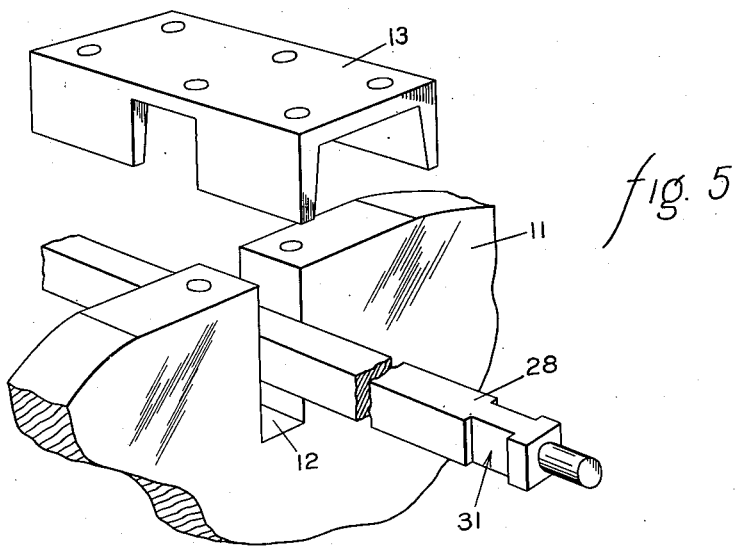
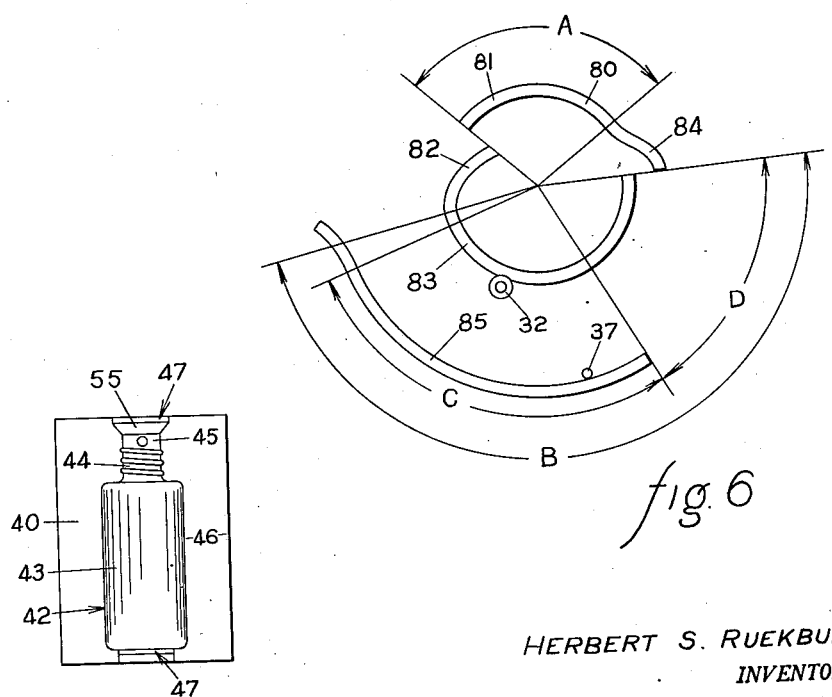
HERBERT S. RUEKBURG
INVENTOR.
ATTORNEY Patented Dec. 18, 1951

2,579,399

UNITED STATES PATENT OFFICE 2,579,399

MACHINE FOR MAKING CONTAINERS FROM PLASTIC TUBING

Herbert S. Ruckberg, Highland Park, Ill.

Application March 5, 1951, Serial No. 213,869

5 Claims. (Cl. 18—19)

This invention relates to a machine for making hollow, plastic articles. More particularly, this invention relates to a machine for continuously molding hollow articles blown from a hollow tubular blank, and to the structural arrangement for, and operation of, such a machine in the vertical plane by which a number of operating advantages are obtained.

In a co-pending application entitled "Method for Making Hollow Articles," Serial No. 171,340, filed June 30, 1950, inventor Elmer E. Mills, and in U. S. Patent No. 2,515,093, there are described a continuous method for successively blowing hollow articles from a tubular or hollow plastic member and one embodiment of a machine capable of carrying out this method. The hereinafter discribed invention relates to another and improved machine for carrying out the broad aspects of the method described in the above identified application.

One of the primary objectives which it is desirable to obtain in the molding of hollow, plastic articles by the method of said application is accuracy of operation of the machine itself whereby the hollow or tubular material to be molded is clamped between the molds precisely at the time at which the material becomes aligned with the mold. It is also essential that each of the various operational steps involved, i. e., the opening and closing of the molds and the admission of the fluid for expanding the softened plastic to the desired shape within the molds, be each carried out rapidly and in precisely timed relationship to each other. Unless a precise, timed relationship is maintained between each of these various steps, the machine may produce an unnecessarily high number of imperfect products.

Further, the production of quality products requires the expansion of the tubular material evenly in all directions until it contacts the walls of the mold. In order to effect this uniform expansion of the tubular material, it is essential, among other things, that all parts of the tubular material be heated or softened to substantially the same degree. When the plastic material comes in contact with one portion of the mold measurably before it comes in contact with the rest of the mold an uneven chilling effect results. That portion of the material first contacted by the mold will be appreciably chilled, reducing the capacity of that material to stretch under the internal pressure. The result of this chilling is an imperfectly formed article, and particularly an article having walls of varying thickness.

In addition to the above problems, there is the problem of changing molds. Since machines of this type are intended to make, at different times, hollow articles of a variety of sizes or shapes, it is of primary concern to reduce both the cost of the molds and the time necessary to change molds. To this end, my new machine eliminates all of the temperature control mechanism from the molds themselves and places it in the members on which the molds are mounted. Thus, each of the molds can be made without consideration of any intricate internal cooling chambers and may be mounted simply by being bolted to its supporting shoe.

It is, therefore, a primary object of my invention to provide a machine for molding hollow, plastic articles rapidly and accurately, while producing a high quality product.

It is a further object of my invention to provide a machine, as aforesaid, designed for high volume production and which will produce an article of more consistent wall thickness than has previously been possible.

It is an additional object of my invention to provide a machine, as aforesaid, in which the various operations of the machine are precisely and accurately timed in relation to each other.

These and other objects and purposes of my invention will be immediately seen by those acquainted with the design of machines of this general type upon reading the following specification and the accompanying drawings.

In the drawings:

Figure 3 is a sectional view substantially as taken along the line III—III of Figure 2.

Figure 4 is a sectional view substantially as taken along the line IV—IV in Figure 2 and rotated clockwise 90 degrees for convenience of illustration.

Figure 5 is a fragmentary, exploded view of the structure for mounting the mold saddles upon the rotatable hub of my machine.

Figure 6 is an end elevation view of the cam tracks on the right hand side of the machine, as appearing in Figure 1, for operating parts of said machine.

Figure 7 is an end view of the cam tracks on the left hand side of my machine, as seen in Figure 1.

Figure 10 is an elevation view of the face of a mold half as viewed from the plane X—X of Figure 8.

Figure 11 is a broken, side view of a mold including the article ejection mechanism substantially as viewed from the plane XI—XI of Figure 4.

Figure 12 is a perspective view of the blank guiding means.

Figure 13 is a sectional view substantially as taken along the line XIII—XIII in Figure 1.

General description

In executing the objects and purposes of my invention I have provided a circular frame disposed for rotation in a vertical plane and along the periphery of which is mounted a plurality of molds. Each of these molds consists of a pair of cooperating halves, which are both preferably independently mounted upon mechanism effecting timed movement thereof, toward and away from each other in a direction parallel to the axis of rotation of the said frame. However, some of the purposes of the invention may be obtained by fixedly mounting one of each pair of mold halves and moving the other of said pair toward and away therefrom. By rotation of the said circular frame, each of the pairs of mold halves is successively brought into vertical alignment with a vertical, hollow column of softened plastic material and clamped around same. A needle is inserted into the portion of the tubular material sealed within each of the molds and a fluid is admitted to expand the softened plastic material to the shape of the mold cavity. After the material has set, the fluid is exhausted and the molds are opened for removal of the finished article. The operation of opening and closing the molds and of admitting exhausting fluid to the portion of material sealed within each of the molds is controlled mechanically by means of a series of rollers riding upon suitable cams.

Detailed description

Figure 1:
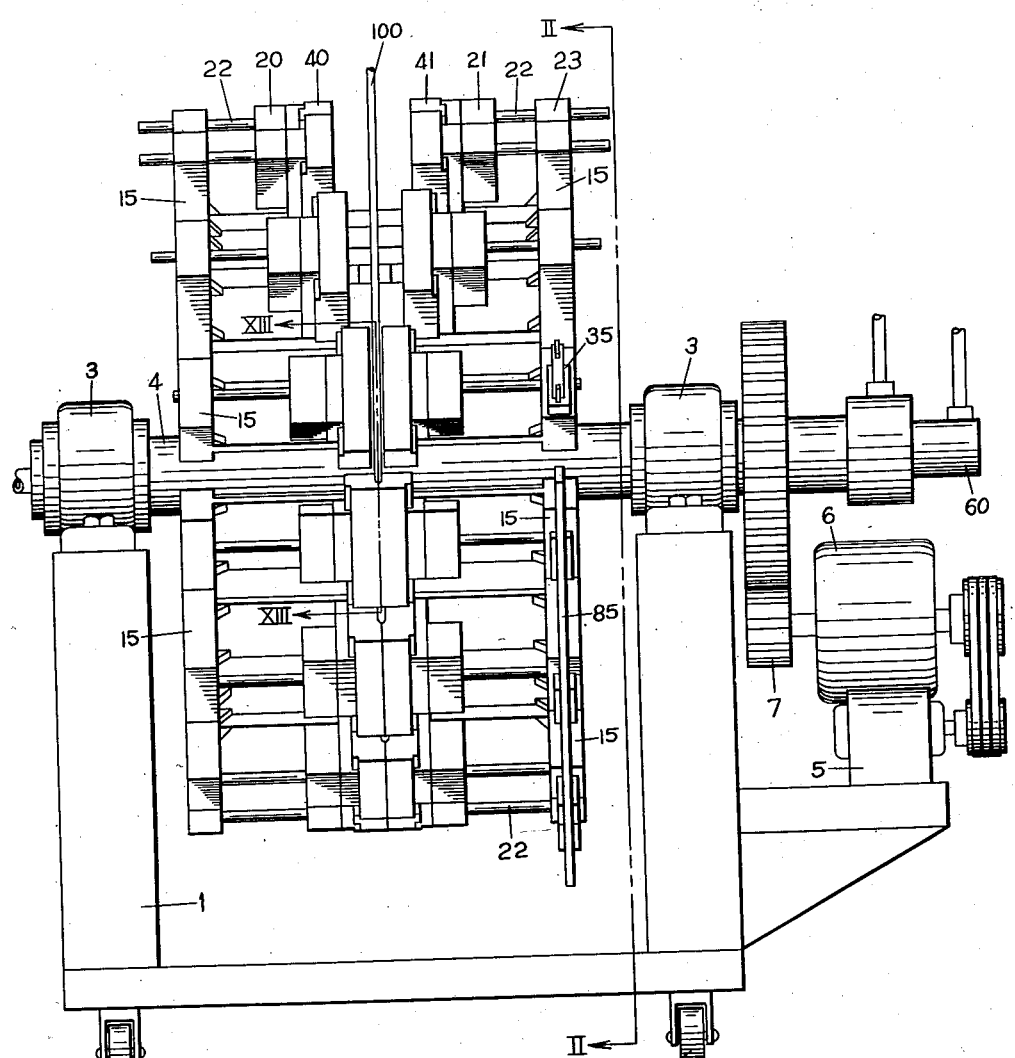
Figure 1 is a side elevation view of my invention with the toggles, or other actuating mechanism, and the knockout and guide mechanisms removed therefrom.

In the following description the terms "upwardly" and "downwardly," where used, are to be taken as "upwardly" in the direction of the machine as normally used and as shown in Figure 1, and "downwardly" away therefrom. The words "inwardly" and "outwardly," where used, will have reference to the geometric center of the machine.

Referring to the drawings in greater detail, the numeral 1 (Figures 1 and 2) indicates a frame having wheels 2 and a pair of bearings 3, rotatably supporting a tubular shaft 4. At one end of the shaft, and mounted on the frame 1, is a source of rotary power, such as the motor 5, which, by means of the gear reducer 6 and gear train 7, drives the shaft 4.

Figure 8:
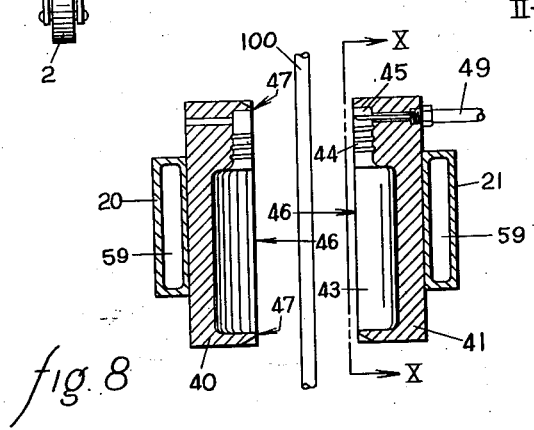
Figure 8 is a sectional view taken along the line VIII—VIII in Figure 3.
Figure 9:
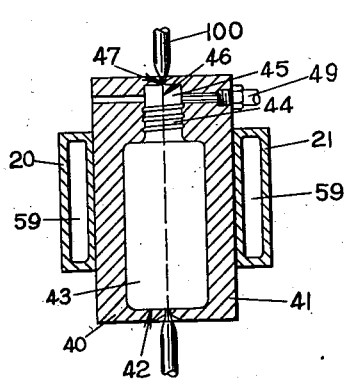
Figure 9 is a sectional view substantially as taken along the line VIII—VIII in Figure 3, and showing the mold in closed position.

Rigidly mounted on the shaft 4, substantially midway between the bearings 3, is a hub 10 (Figures 3 and 4). Mounted to the periphery of the hub 10 is a rim 11 which may be removably mounted in order to facilitate the changing and spacing of the molds. The molds, and mold actuating means are mounted on said rim. A number of interchangeable rims having various outside diameters and/or mold stations may be provided. Further, although changes in mold sizes and shapes are normally and preferably made by changing the molds, only, such may also be accomplished by changing rims having molds of various sizes and shapes thereon. For receiving the mold thereon, the rim 11 is equipped with a plurality of equally spaced, radially aligned slots 12 (Figure 5). The periphery of the rim 11 on each side of each of the slots 12 is flattened to provide a suitable seat for one of the mounting plates 13. The mounting plates 13 are removably attached to the rim 11 by means, such as bolts. Detachably fastened to each of the mounting plates 13 is one of the I-shaped saddles 14 (Figures 3 and 4). Both the mounting plates 13 and the saddles 14 extend transversely of the rim 11, that is, parallel to the shaft 4. Each saddle 14 is provided at each of its transverse ends with an outwardly extending flange 15 and a pair of inwardly extending, spaced, guide legs 16. Between the flanges 15 a pair of parallel guide rails 17 (Figures 4 and 11), which are supported by the ears 18 upon the saddle 14, slidably mount a pair of shoes 20 and 21, each having an internal, heat exchange fluid chamber 59 (Figures 8 and 9). At their respectively outward ends, each of the shoes 20 and 21 is supported by a guide rod 22 designed to slide through a suitable opening in one of the guide blocks 23 mounted on the outward surfaces of each of the flanges 15.

The shoes 20 and 21 are connected to their adjacent flanges 15 by means of toggle linkage 24 (Figures 3 and 4). Each of the toggle linkages is provided with a lug 25 on one of its links and a cooperating stop pin 26 on the other of its links for limiting movement of the toggle at a point slightly beyond its fully extended, or dead center, position. This is to provide a positive lock against collapse of the toggle as pressure is applied to the molds during the molding operation. Each of the toggle linkages 24 is, at its hinge point, connected by a lever 27 to the cam arm 28.

Each cam arm 28 is seated at its midpoint in one of the slots 12 in the rim 11, and near each end is seated between one of the pairs of spaced legs 16 extending inwardly below each of the flanges 15. The notches 31 on each side of the cam arm 28 (Figure 5) engage the legs 16, preventing the cam bar from moving transversely of the molding machine. Each end of the cam arm 28 is equipped with a roller 32 (Figures 3 and 4). Each of the cam arms 28 is free to move inwardly and outwardly for actuating the linkages 24 and alternately opening and closing its respective mold. A three-way valve 35 (Figure 4) is mounted on the outward face of one of the guide blocks 23, the operation of which valve is controlled by an outwardly extending arm 36 having a roller 37 on its outward or free end.

Each of the shoes 20 and 21 detachably mounts and supports one of the mold halves 40 and 41, respectively. Each of the mold halves 40 and 41 contains a mold cavity 42 (Fig. 9), which mold cavities cooperate with each other and may include a main body portion 43, a neck portion 44 and a neck extension portion 45. At each end of each of the mold halves the meeting face 46 of each mold half has a pressure surface 47 for pinching the hollow blank into closed sections, as hereinafter described. The surface 47 may or may not be depressed depending on whether or not, for handling purposes, it is desired to have the articles at the end of the molding step separable with lesser or greater care.

The mold half 41 (Figures 8 and 9) is provided with an opening communicating with the neck extension portion 45 of the mold cavity 42. A hollow needle 49, mounted upon the mold half 41, extends through this opening into the mold cavity 42. The hollow needle 49 is connected to the valve 35 by means of the flexible hose 50.

The neck extension portion 45 of the mold cavity in each of the mold halves 40 and 41 is provided with a widened or relief zone 55 (Figure 10), the width of which is substantially equal to the width of the hollow blank, which is supplied to the mold, when said blank is flattened until its walls contact each other.

The shaft 4 is hollow and the central chamber 62 thereof (Figure 4) is divided into non-communicating sections by means of baffles. At the end of the shaft 4 mounting the gear train 7, the shaft is equipped with an internal, concentric pipe 60 which passes through the shaft to the baffle 61. The pipe 60 conducts fluid into the molding machine which then flows into the central chamber 62 in the shaft 4 and thence into the annular conduit 63. The annular conduit 63 is connected to each of the shoes 20 and 21 by the flexible hoses 64 and 65, respectively. A second annular conduit 66 surrounds the shaft 4 and communicates with the chamber 67 surrounding the pipe 60. By means of the flexible hoses 68 and 69, the shoes 20 and 21, respectively, are connected to the annular conduit 66. An incoming fluid for controlling the temperature of the molds enters the molding machine through the pipe 60 and then, by means of the central chamber 62, the annular conduit 63 and the hoses 64 and 65, this fluid passes through the fluid chamber 59 in each of the shoes. The fluid is exhausted through the tubes 68 and 69, the annular conduit 66 and the chamber 67.

At the end of the shaft 4 opposite from the pipe 60 and chamber 67 a further chamber 70 is provided, which chamber is sealed from the chamber 62 by the baffle 71. A compressed fluid, such as air, is admitted to the chamber 70 at the chamber's outward end. The compressed fluid passes through a circular conduit 72 and then by means of the pipe 73 to the valve 35.

The opening and closing of the molds and the admission of pressure fluid through the needle 49 are each controlled by means of a cam arrangement. The rollers, or cam followers, 32 on each of the ends of the cam arm 29 contact stationary tracks, or cams, which alternately move the rollers inwardly and outwardly. The track arrangement on one side of the molding machine is illustrated in Figure 6 and consists of a track 80 so mounted that, when the rollers 32 are contacting this track, the cam arm 28 is forced inwardly, folding or retracting the toggle linkages 24 for opening the molds. As the shaft 4 turns, the roller 32 leaves the end 81 of the track 80 and contacts the end 82 of the track 83, whereupon the roller 32 is forced outwardly extending the toggle linkage for closing the molds. The track 83 maintains the cam arm 28 in its outward position until the roller 32 leaves the track 83 and contacts the lead end 84 of the track 80. The lead end 84 is designed to force the roller 32 inwardly, thus again opening the mold.

Outwardly of the track 83 is a secondary track 85 for controlling the flow of the pressurized fluid through the needle 49. The track 85 is designed to contact the roller 37 on the extending arm 36 operating the valve 35. Upon contacting the track 85, the roller 37 is forced inwardly for opening the valve 35. The track 85 effects an opening of the valve 35 substantially immediately after the track 83 has caused the mold to close. The track 85 terminates at such a point with respect to the track 83 that the flow of pressure fluid into a given mold will terminate while said mold is still closed. In the specific embodiment here selected for illustrative purposes, the track 85 terminates approximately adjacent to the midpoint of the track 83. By this means, while the mold remains closed, the supply of air or fluid for shaping the article within the mold is shut off and the pressure existing within the article is released to assure the article of a pressure equilibrium with the ambient atmosphere when the mold is opened by the lead end 84 of the track 80. On the opposite side of the machine from the tracks 80, 83 and 85 is an additional track 86 (Figure 7) identical with and a mirror image of the track 83 and a track section 87 identical with the lead end 84 of the track 80. No track comparable to the remainder of the track 80 is provided although such is possible and may be provided if desired. The part "A" of the track 80 maintains the molds in open position against the resistance of the flexible hose 50 which is connected to the shoe 21 and hence affects the position thereof. Since no such flexible hose is connected to the shoe 20, it is unnecessary to provide in association with track 87 any further track corresponding with the part "A" of track 80.

The tracks 80, 83, 85, 86 and 87 are each rigidly mounted to the frame 1 of the machine and are stationary with respect thereto.

The completed articles are removed from the molds by means of the ejection mechanism (Figure 11). The ejection mechanism consists of a rod 90, mounted by means of the block 91 to the saddle flange 15, and the ejector pin 92. The ejector pin 92 positioned co-axial with the rod 90, has a stem 93 slidably seated in an opening in the mold half 40 communicating with the neck extension portion 45 of the mold cavity 42. The ejector pin is normally retained in retracted position by the spring 94. The actuation of the ejection mechanism is controlled by the position of the rod 90 which is adjustable with respect to the ejector pin 92. The rod 90, once properly positioned, is locked into position by the set screw 95. A separate ejection mechanism is provided for each of the molds.

Means guiding the extrusion or hollow blank 100 into the molds are indicated at 96 (Figures 11, 12 and 13). This comprises a base block 97 mounted on the saddle flange 15 (Figures 3 and 4). A movable block 98 is mounted on the block 97 by suitable slides 99 and threadedly associated therewith for fine adjustment toward and away from the base block 97 by the screw 103 operated by the knob 104. The guide rod 105 extends from the movable block 98 across the molds to hold the extruded tube in proper position with respect to said molds as said molds are closing, as shown in Figure 13. In this way, the extrusion 100 can be precisely positioned with respect to each mold. Due to the circular motion of the any one mold after it seizes a segment of the blank, the blank, except for the action of those guide rods 105, would no longer be in a vertical position with respect to the mold next following. Further, the guide rods 105 will, if needed, compensate for slight differences in the positioning of each mold with respect to the center of shaft 4 and will make unnecessary a precise positioning of the source of supply for said tube with respect to the machine herein described.

Operation

Figure 2:
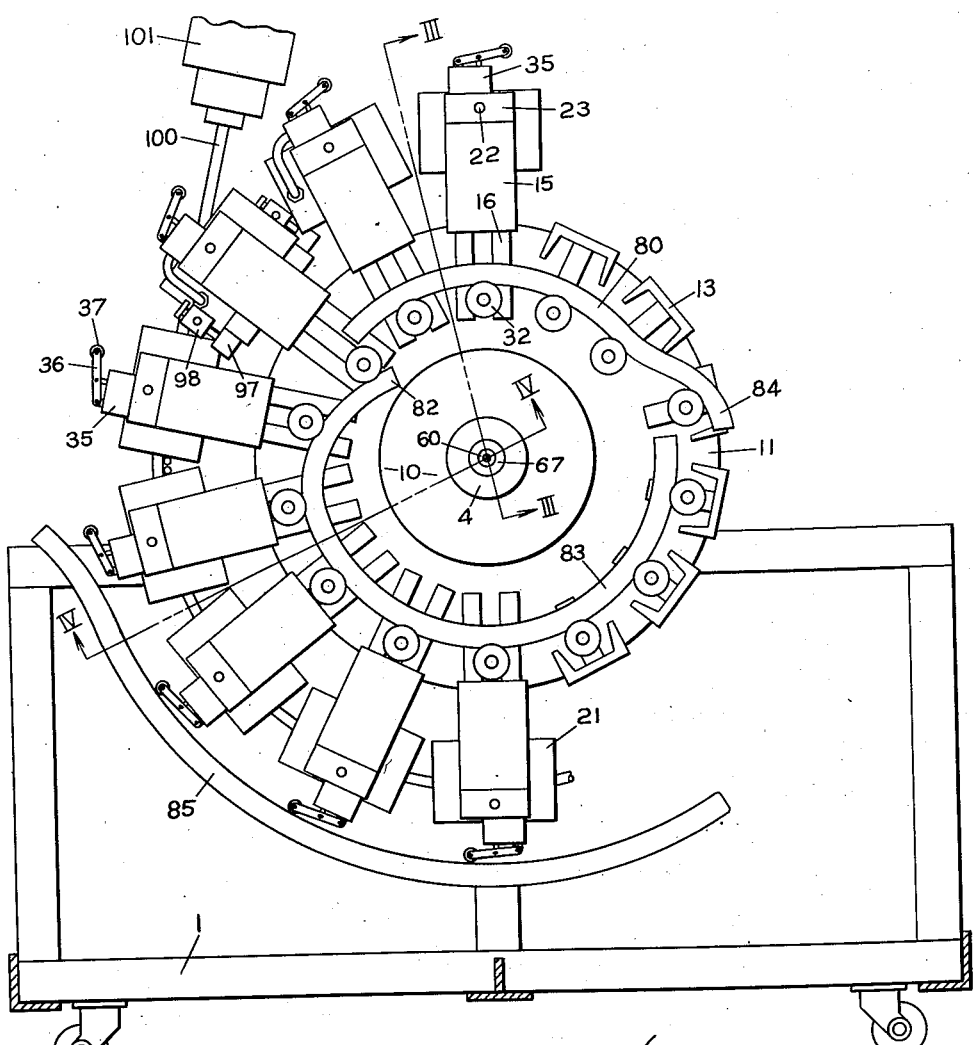
Figure 2 is a sectional view of my machine taken along the plane II—II of Figure 1 with a fragmentary showing of a portion of the molds and mold supporting structure.

The molds are continuously rotated in a vertical plane at a substantially constant speed and are opened as they move upwardly toward the top of the machine. The molds remain open as they start to descend toward the bottom of the machine. A hollow column or tubular member 100 of softened, plastic material is continuously supplied from any convenient source, as by being extruded from the extruding machine 101 (Figure 2). At a point substantially in a horizontal plane passing through the center of the shaft 4 each of the molds becomes successively tangential with the tube or column of plastic material 100. The plastic material 100 is centered midway between the mold halves 40 and 41 and is aligned along the longitudinal centerline of the mold by the guide rods 105 (Figs. 11, 12 and 13). By means of the end 82 of the track 83 the mold is closed about this tube of material. In this closing operation the mold halves 40 and 41 each move simultaneously toward a common center, which also approximately coincides with the centerline of the tube of plastic material. As the mold halves move toward each other, they contact the tube of plastic material substantially simultaneously and pinch its walls together at each end of the mold to seal each end of the portion of the tubular material within the mold against the passage of a fluid under pressure.

In the operation of closing the mold, the needle 49 pierces the portion of tubular material enclosed within the mold and preferably outside of the portion thereof which will become the finished hollow article. The plasticity of the material creates a suitable seal about the needle. As soon as the mold halves have been closed, contact between the roller 37 and the track 85 moves the roller 37 inwardly, opening the valve 35 to admit compressed air or other suitable pressurized fluid through the needle 49. The resulting internal pressure expands this portion of material to fill the mold cavity. Pressure is maintained within the article until the mold reaches approximately the bottom of the machine at which point the track 85 terminates and the extending arm 36 is resiliently urged outwardly to close the valve 35 against admission of further pressurized fluids. The valve 35 is a three-way valve whereby as it shuts off the supply of pressurized fluid to the mold, it permits the pressurized fluid already within the mold to escape through the valve, thus relieving the pressure within the article. This equalization of pressure is accomplished before the rollers 32 on the cam arm 28 contact the tracks 80 and 87 and the mold is opened.

The operating relationships between the various tracks are shown in Figure 6. The molds are open as they pass through the arc 'A' and are closed through the arc 'B'. The intervals between these arcs represent the time utilized for opening or closing the molds. It will be noted that the arc 'C', representing the interval during which the pressurized fluid is admitted for forming the articles, is a segment of the arc 'B'. The arc 'D' represents the interval allowed between the release of the internal pressure and the opening of the mold for equalization of the pressure within the mold to that of the ambient atmosphere.

As the molds are opened, the movement of the mold half 40 brings the end of the ejector pin 92 into contact with the rod 90. This forces the ejector pin 92 into the neck portion of the mold cavity, removing the molded article and compressing the spring 94. As the mold is closed, the ejector pin 92 and the rod 90 disengage, and the spring 94 causes the ejector pin 92 to move to the withdrawn position.

A suitable coolant, such as water, is circulated through the fluid chambers 59 of the shoes 20 and 21, to set the material rapidly after the molds have closed. Thus, the number of molds necessary to utilize the extrusion capacity of a standard extrusion machine may be reduced and this permits a reduction in the over-all size of the machine. Since the cooling is effected by means of chambers within the shoes 20 and 21 which remain permanently mounted on the molding machine, rather than within the mold halves 40 and 41, which are replaceable, the cost of the individual mold halves is considerably reduced. The mold halves then need only provide the mold cavity and the need for fluid chambers and pipe connections for servicing these chambers is eliminated. Thus, once the shoes 20 and 21 are connected, there is no further necessity for connecting and disconnecting them from their fluid exhaust and supply lines.

By use of the cam and track arrangement, the two halves of the mold are equally and simultaneously moved toward each other. This is important because it assures simultaneous, or substantially simultaneous, contact of each of the mold halves with the tubular material. Unless this simultaneous contact is obtained, the material may be chilled on one side more than it is on the other. When such chilling occurs, the material does not expand evenly under the internal pressure after the mold has closed. Once the molds have been closed, the cooperation between the lug 25 and the stop pin 26 prevents the toggle linkages 24 from retracting until such time as the levers 27 are positively moved inwardly. This functions as a positive stop against any tendency of the molds to open under the internal pressure resulting from forming the article.

The vertical arrangement of the path of the molds facilitates the feeding of the tubular material to the molds. Since the tube of plastic material hangs downwardly from the extrusion head, it is easily guided to align it with the molds.

The vertical disposition of the tube 100 as it comes from the extruder 101 utilizes gravity to assist in pulling the tube from the extruder. Thus, less positive pulling force is required of the molds. When necessary, any suitable conventional means for heating or cooling the tube of material may be provided between the extrusion head and the molds. The portable frame 1 supporting the molding machine permits the machine to be moved from one extruder to another. Thus, when it is desired to change material or color, this may be accomplished simply by moving the herein described machine to another extruder wherein the desired material may have previously been prepared.

Numerous modifications of my molding machine may be made, each without departing from the principle of my invention. Each of these modifications is to be considered as included in the hereinafter appended claims, unless these claims expressly state otherwise.

I claim:

1. In a machine for making hollow articles from a continuously moving column of hollow, softened, plastic material, the combination comprising: a frame; a horizontal shaft rotatably mounted on said frame; a hub rigidly mounted on said shaft; a plurality of circumferentially, equally spaced saddles mounted on said hub, each of said saddles disposed parallel to said shaft; a pair of mold shoes slidably mounted on each of said saddles for movement in directions parallel with said shaft; a mold half mounted on each of said shoes; means for individually moving said mold shoes a substantially equal distance whereby the mold halves of respective pairs are alternately closed together and substantially spaced apart; a hollow needle mounted on one of said mold halves and communicating with the interior thereof; means for admitting a fluid under pressure into said needle when said mold is closed; a stationary track of varying radial spacing from said shaft, said means for moving said shoes including a cam arm riding on said track; and means for rotatably driving said shaft.

2. In an apparatus for making hollow, plastic articles from a continuously moving body of plastic material in hollow form; the combination: a frame; a hub supported on said frame for rotation about a horizontal axis; a plurality of circumferentially spaced mold supports mounted on said hub; a pair of mold shoes slidably mounted on each of said mold supports for movement parallel to said shaft; a mold half having an interior mold cavity detachably mounted on each of said shoes; means for individually moving each of the mold shoes of respective pairs a substantially equal distance toward and away from each other whereby said mold halves are alternately closed together and substantially spaced apart; a first stationary track of varying radial spacing from the axis of said hub, said means for moving said shoes including a cam arm riding on said track; means for rotating said hub whereby each of said molds will be successively aligned with said plastic material and said first track will urge said cam arm to close successively each of said molds about said plastic material; a hollow needle mounted on one of each of said pairs of mold halves and communicating with the cavity therein for admitting a fluid under pressure into the section of plastic material enclosed in each said mold; a valve associated with each of said molds for regulating the flow of fluid through each of said needles; a second stationary track; and means on each of said valves contacting said track for opening said valves for a portion of the period during which each of said molds is closed.

3. In a machine for making hollow, plastic articles from a continuously moving, vertical column of hollow, softened, plastic material, the combination comprising: a frame; a hub mounted on said frame for rotation about a horizontal axis; a plurality of equally spaced molds mounted about the periphery of said hub, each of said molds having a pair of mold halves each including a mold cavity and slidably mounted for substantially equal reciprocating movement in a direction parallel with said axis from a contacting position to a substantially spaced position; a first stationary track variably spaced from the axis of said hub; a cam arm riding on said first stationary track; means attached to both said cam arm and each of said mold halves for translating movement of said cam arm into said reciprocating movement of said mold halves; a hollow needle associated with one of the mold halves of each of said molds for puncturing said plastic material; means for conducting a fluid under pressure to said needle; a second stationary track; a valve in said fluid conducting means, said valve having actuating means contacting said second stationary track; and means for rotating said hub and successively aligning each of said molds with said vertical column of plastic material; said cam arm contacting said first track, as said hub is rotated, opening said molds before said molds become aligned with said plastic material and closing said molds on said plastic material when said molds are aligned with said plastic material, said valve actuating means opening said valve and closing said valve while said molds are closed.

4. A machine for making hollow, plastic articles as described in claim 3 wherein said means attached to both said cam arm and each of said mold halves includes a pair of toggles, one link of each of said toggles, being attached to one of said mold halves, the other link of each of said toggles being pivotally mounted with respect to said frame; and a pair of link bars, each of said link bars being mounted at one of its ends on said cam arm and at the other of its ends on one of said toggles at the hinge point of its links.

5. In a machine for making hollow plastic articles from a continuously moving column of hollow, softened, plastic material, the combination comprising: a frame; a hub mounted on said frame for rotation about a horizontal axis; a plurality of pairs of separable mold halves mounted about the periphery of said hub; a pair of toggle linkages for individually opening and closing each of said pairs of mold halves; a cam arm for actuating each of said toggle linkages; means for rotating said hub and thereby successively aligning each of said molds with said column of plastic material; first track means contacting said cam arms and individually urging said cam arms radially outwardly as each of said molds becomes aligned with said column of plastic material for successively closing each of said molds about said column of plastic material; a step in said track for urging each of said cam arms radially inwardly for successively opening each of said molds; a plurality of hollow needles, one associated with each of said molds for puncturing the portion of said plastic material clamped within each said mold and admitting a fluid pressure to said portion of plastic material; a second track and a valve for controlling the flow of said fluid through said needle, said valve having a cam movable along said second track and said track being disposed to open said valve during a portion of the interval while said molds are closed.

HERBERT S. RUEKBERG.

No references cited.